United States Patent
Le Normand et al.

(10) Patent No.: US 12,037,947 B2
(45) Date of Patent: *Jul. 16, 2024

(54) DEVICE FOR DISTRIBUTING FUEL FLOWS FOR A FUEL SUPPLY CIRCUIT OF A TURBOMACHINE COMBUSTION CHAMBER

(71) Applicant: SAFRAN AIRCRAFT ENGINES, Paris (FR)

(72) Inventors: Kevin Didier Pierre Le Normand, Moissy-Cramayel (FR); Frederic Brettes, Moissy-Cramayel (FR); Loic Pora, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/248,666

(22) PCT Filed: Oct. 5, 2021

(86) PCT No.: PCT/FR2021/051728
§ 371 (c)(1),
(2) Date: Apr. 11, 2023

(87) PCT Pub. No.: WO2022/079372
PCT Pub. Date: Apr. 21, 2022

(65) Prior Publication Data
US 2023/0392550 A1    Dec. 7, 2023

(30) Foreign Application Priority Data

Oct. 14, 2020    (FR) ........................................ 2010482

(51) Int. Cl.
*F02C 7/22* (2006.01)
*F02C 7/232* (2006.01)
(Continued)

(52) U.S. Cl.
CPC .............. *F02C 7/222* (2013.01); *F02C 7/232* (2013.01); *F02C 7/236* (2013.01); *F23R 3/283* (2013.01);
(Continued)

(58) Field of Classification Search
CPC .......... F23R 3/2383; F23R 3/286; F23R 3/28; F23R 3/283; F23R 3/34; F02C 7/222; F02C 7/22; F02C 7/232; F02C 7/236
See application file for complete search history.

(56) References Cited

U.S. PATENT DOCUMENTS

| | | | |
|---|---|---|---|
| 3,511,259 A | 5/1970 | Kleber | |
| 2007/0028618 A1* | 2/2007 | Hsiao | ..................... F23R 3/343 60/737 |

(Continued)

FOREIGN PATENT DOCUMENTS

| | | |
|---|---|---|
| FR | 2999653 A1 | 6/2014 |
| FR | 3080437 A1 | 10/2019 |
| WO | 2014/096620 A1 | 6/2014 |

OTHER PUBLICATIONS

International Search Report received for PCT Patent Application No. PCT/FR2021/051728, mailed on Nov. 17, 2022, 6 pages (2 pages of English Translation and 4 pages of Original Document).

*Primary Examiner* — William H Rodriguez
(74) *Attorney, Agent, or Firm* — WOMBLE BOND DICKINSON (US) LLP (57) ABSTRACT

A device for distributing at least one fuel flow for a circuit for supplying fuel to a combustion chamber of a turbo machine, in particular of an aircraft, the device including a rotating main body extending about a longitudinal axis, the main body including an internal flow duct for a first flow of fuel, extending through the main body along the axis, a first annular portion configured to form an outlet passage for a second flow of fuel, and including at least one orifice for the (Continued)

second flow of fuel to pass through, and an external annular groove in fluidic communication with the at least one orifice in the first portion.

17 Claims, 5 Drawing Sheets

(51) Int. Cl.
    *F02C 7/236*     (2006.01)
    *F23R 3/28*     (2006.01)
    *F23R 3/34*     (2006.01)

(52) U.S. Cl.
    CPC .... *F05D 2220/323* (2013.01); *F05D 2240/35* (2013.01); *F23R 3/34* (2013.01)

(56) References Cited

U.S. PATENT DOCUMENTS

| | | | |
|---|---|---|---|
| 2008/0078181 A1* | 4/2008 | Mueller | F23R 3/286 |
| | | | 60/776 |
| 2008/0163627 A1* | 7/2008 | ELKady | F23R 3/14 |
| | | | 60/737 |
| 2009/0008474 A1* | 1/2009 | Miyake | F23D 11/36 |
| | | | 239/88 |
| 2009/0038312 A1* | 2/2009 | Hernandez | F23D 11/36 |
| | | | 60/748 |
| 2012/0047900 A1 | 3/2012 | Böttcher et al. | |
| 2012/0198853 A1* | 8/2012 | Hernandez | F23D 11/36 |
| | | | 60/740 |
| 2017/0122211 A1* | 5/2017 | Zhang | F02C 7/222 |
| 2017/0298829 A1* | 10/2017 | Ozem | F02C 7/222 |
| 2021/0262665 A1 | 8/2021 | Bourgois et al. | |
| 2021/0381436 A1* | 12/2021 | Matsuyama | F23R 3/283 |

\* cited by examiner

DEVICE FOR DISTRIBUTING FUEL FLOWS FOR A FUEL SUPPLY CIRCUIT OF A TURBOMACHINE COMBUSTION CHAMBER

TECHNICAL FIELD OF THE INVENTION

The present invention concerns a distribution device of fuel flows and a fuel supply circuit for a combustion chamber equipped with such a device for mixing them. The invention is also aimed at a turbomachine supplied via this fuel circuit and in particular an aircraft turbomachine.

BACKGROUND OF THE INVENTION

The state of the art comprises in particular the document US-A1-2012/0047900.

A turbomachine, in particular for an aircraft, comprises a gas generator comprising one or more compressors, for example low pressure and high pressure, arranged upstream of a combustion chamber.

Traditionally, the combustion chamber is supplied with compressed air from the high-pressure compressor via an annular diffuser, and with fuel via a fuel supply circuit comprising injectors distributed angularly around a longitudinal axis of the turbomachine.

The fuel circuit may comprise the following elements listed here in the flowing orientation of the fuel from upstream to downstream:
  a fuel tank for the storage of the fuel,
  a low pressure LP pump to ensure the supply of fuel from the tank,
  a fuel filtration unit to limit (or even eliminate) the contaminants in the fuel leaving the LP pump,
  a high pressure pump HP,
  a metering unit, usually referred to as FMU (Fuel Metering Unit), and
  a set of injectors delivering the total flow of fuel into the combustion chamber of the turbomachine.

In general, the LP and HP pumps can be secured to and driven by a same output shaft of an accessory gearbox (AGB) of the turbomachine.

The LP pump allows the convey of fuel towards the HP pump, which supplies fuel to the metering unit at a flow rate greater than the fuel requirement of the combustion chamber.

Figure 1:
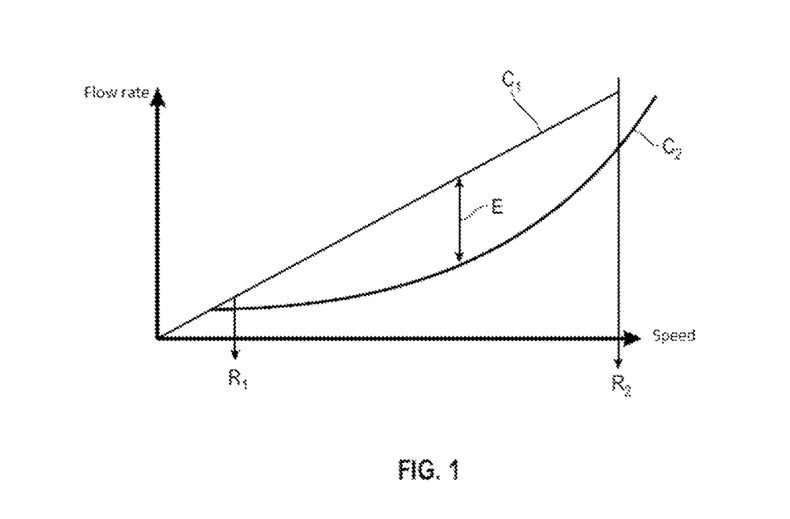
FIG. 1 is a schematic diagram showing the fuel flow rate provided by a high-pressure pump of a fuel supply circuit and the fuel flow rate required by a combustion chamber.

FIG. 1 shows schematically the fuel flow rate (or flow) injected by the HP pump of the supply circuit as a function of the speeds of the combustion engine of the turbomachine. The linear curve $C_1$ represents a steady increase in the fuel flow rate provided by the HP pump between the operation speeds $R_1$ and $R_2$ of the turbomachine. The speed $R_1$ represents the fuel flow rate at start-up or during the wind milling phase in flight or on the ground of the turbomachine. The speed $R_2$ represents the fuel flow rate at a maximum normal operating speed of the turbomachine (as at the time of the take-off of the aircraft). The curve $C_2$ represents the fuel requirement of the combustion chamber to operate at speeds $R_1$ and $R_2$. This curve $C_2$ represents a fuel flow rate that meets the needs of the combustion chamber and is much lower than the fuel flow rate injected by the HP pump in the curve $C_1$. The amount of excess fuel is represented by an arrow E in FIG. 1.

This excess fuel is recirculated through the fuel supply circuit. To this end, the circuit also comprises a recirculation channel configured to return from the metering unit FMU towards an inlet of the HP pump, a second fuel flow corresponding to the excess fuel quantity of the metering unit.

Thus, the first flow and the second flow of fuel mix before entering the HP pump. The outlet of the recirculation channel is usually close to the fuel inlet of the HP pump to optimise in particular the overall dimension and the space in the turbomachine. The main disadvantage of this configuration is that the first and second fuel flows entering the HP pump are not perfectly homogenised. This can cause a cavitation (i.e., bubbles) in the fuel flowing supplying the HP pump, which may damage the latter. As a result, the performance of the HP pump may be degraded and its service life limited.

It is known from the prior art a fuel supply circuit for a combustion chamber of an aircraft turbomachine comprising a recirculation loop of an excess amount of fuel from a metering unit towards a fuel tank or a jet pump arranged upstream of a HP pump, as described in the documents FR-A1-2999653 and WO-A1-2014/096620 respectively. When the fuel is returned towards the tank, the issue of the homogenisation of the fuel upstream of the HP pump does not arise. The jet pump is able to mix the first fuel flow from a LP pump and the second flow from the metering unit to supply fuel to the HP pump. However, the disadvantage of the jet pump is that it requires complicated and bulky installation.

In this context, it is interesting to overcome the disadvantages of the prior art, by proposing a reliable multi-fuel flow distribution device that can be integrated into a fuel supply circuit of a combustion chamber, while allowing its simple and rapid assembly in a turbomachine.

SUMMARY OF THE INVENTION

The invention proposes a fuel supply circuit for a combustion chamber of a turbomachine, in particular for an aircraft, comprising:
  a supply channel configured for the circulation of a first fuel flow from a fuel tank;
  a metering unit configured to provide a predetermined flow rate of fuel into the combustion chamber;
  at least one supply pump for circulating the fuel from the tank towards the metering unit;
  a recirculation channel for a second fuel flow, corresponding to a quantity of excess fuel from the metering unit, upstream of the supply pump;
  the supply and recirculation channels opening in different directions upstream of the supply pump.

According to the invention, the circuit comprises a distribution device of at least one of the fuel flows which comprises an internal conduit for the flow of the first fuel flow, an external annular gorge for the flow of the second fuel flow and at least one orifice for the passage of the second flow which is in fluidic communication with the annular gorge.

According to the invention, said at least one orifice and said internal conduit are coaxial and open upstream of the supply pump respectively.

Thus, this solution allows to achieve the above-mentioned objective. In fact, such a configuration allows to dissociate at least two fuel flows coming from different directions and to direct them in a same direction by means of the distribution device of the invention. This allows for an optimal and homogeneous mixing of these flows to open into the supply pump of the fuel supply circuit for a combustion chamber.

In particular, the fuel flows entering the distribution device have different flow rates and therefore come from separate and secants channels upstream of the device (and therefore upstream of the supply pump). These flows entering the device are regulated by coaxial flowing conduits (i.e., the internal flowing conduit of the first flow and the at least one orifice for the passage of the second flow), so that the flows do not interfere with each other to form turbulences and/or cavitations. Thus, the flows leaving the distribution device have the advantage of having a stable flow rate and therefore being in a state of rest. In this way, the stable flow rate flows mix at the outlet of the distribution device to open into the supply pump with a homogeneous mixture and without cavitation. The supply pump of the circuit of the invention is therefore not damaged by the fuel flows from the supply and recirculation channels of the circuit. This greatly improves the service life and the performance of the supply pump.

The invention thus has the advantage of proposing a simple design, offering very high reliability, and with little penalty in terms of cost and overall dimension requirements for the turbomachine.

The fuel supply circuit according to the invention also comprises one or more of the following characteristics, taken alone or in combination:
- the supply channel opens downstream into the internal conduit for the flow of the distribution device and the recirculation channel opens into the annular gorge of the distribution device;
- the device is mounted in a housing arranged upstream of the supply pump, and in which said at least one orifice and said internal conduit open into a mixing area of the housing;
- the supply and recirculation channels are configured to open in a secant manner into the housing, wherein a downstream end of the supply channel opens into the internal conduit and an upstream end of the recirculation channel opens into the external annular gorge;
- the downstream end of the supply channel opening into the internal conduit for the flow extends substantially axially or inclined with respect to the axis A;
- the upstream end of the recirculation channel opening into the annular gorge extends substantially perpendicular or inclined with respect to the axis A;
- the distribution device comprises a main body of revolution extending about a longitudinal axis and comprising:
  - the internal conduit for the flow of the first fuel flow which extends through the main body along the axis A, and
  - a first annular portion configured to form an outlet passage for the second fuel flow, and the first annular portion comprising said at least one orifice for the passage of the second fuel flow which is distributed in an annular row of orifices around the axis;
- said at least one orifice extends along an axis parallel to the axis of the internal conduit;
- said internal conduit for the flow and said at least one orifice are configured to open transversely to an axis about which the supply pump extends;
- the main body further comprises a second annular portion configured to form an inlet passage for the first fuel flow through the internal conduit, the second portion is connected to the first portion via an intermediate portion delimiting at least partly the central opening;
- the second portion further comprises at least one annular sealing and attaching groove configured for mounting a sealing element;
- the supply pump of the fuel circuit comprises a low pressure pump (e.g., rotodynamic type) and/or a high pressure pump (e.g., of the volumetric gear type);
- the housing and the mixing area are arranged upstream of the high pressure pump;
- the internal conduit for the flow for the first fuel flow is formed by a central opening.

The present application further relates to a turbomachine, in particular an aircraft turbomachine, comprising a fuel supply circuit according to one of the particularities of the invention, for a combustion chamber of the turbomachine.

The invention also proposes a distribution device of at least one fuel flow for a fuel supply circuit of a combustion chamber of a turbomachine, in particular of an aircraft, the device comprising a main body of revolution extending about a longitudinal axis A. The main body comprises:
- an internal conduit for the flow of a first fuel flow and extending through the main body along the axis A, and
- a first annular portion configured to form an outlet passage for the second fuel flow, and comprising at least one orifice for the passage of the second fuel flow.

The distribution device according to the invention has the advantage of ensuring several functions within the fuel supply circuit, namely:
- guiding the first fuel flow from a supply channel of the circuit (e.g., from a first filtration unit with reference to the example described below or from a low pressure pump);
- guiding the second fuel flow from a recirculation channel in the circuit;
- directing the first and second flows in a same direction (e.g., in particular through the coaxial flowing conduits);
- sealing the housing arranged in at least one of the casings of the components of the fuel circuit (e.g., between the casings of the first filter unit and a high pressure pump with reference to the example described below).

Furthermore, as described above, the distribution device equipping the fuel circuit thus allows to separate the first flow and the second flow coming from channels in different directions, and to direct them in a same direction at the outlet of the device. This allows the flow rate of each of the fuel flows to be slowed down, so as to limit (or even eliminate) turbulence and/or cavitation in the fuel leaving the device. In this way, the fuel flow entering a supply pump of the circuit is optimally homogenised, in particular after passing through a mixing area located between the supply pump and the device.

The distribution device according to the invention also comprises one or more of the following characteristics, taken alone or in combination:
- the device comprises an external annular gorge which is in fluidic communication with the at least one orifice of the first portion;
- said at least one orifice for the passage of the second fuel flow is distributed in an annular row of orifices;
- the annular row of orifices each extends along an axis parallel to the axis A;
- the main body further comprises a second annular portion configured to form an inlet passage for the first fuel flow through the internal conduit;
- the second portion is connected to the first portion via an intermediate portion of the distribution device delimiting at least partly the internal conduit;

the second portion comprises an annular collar extending radially about the axis A;

the annular gorge is delimited at least partly by a flank of the collar and a first portion wall;

the second portion further comprises at least one annular sealing and attaching groove configured for mounting a sealing element;

the first annular portion has an external diameter smaller than the external diameter of the annular collar of the second annular portion;

each orifice in the annular row of orifices has a diameter of between 3 and 10 mm, preferably between 5 and 7 mm, and even more preferably about 5.5 mm;

the annular row of orifices comprises between five and twenty orifices, preferably between fifteen and twenty orifices, and even more preferably about seventeen orifices.

The present application further relates to a turbomachine, in particular an aircraft turbomachine, comprising at least one distribution device of at least one fuel flow according to one of the characteristics of the invention, for a combustion chamber of the turbomachine.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

By convention, in the following description, the terms "longitudinal" and "axial" refer to the orientation of structural elements extending in the direction of a longitudinal axis X. This axis X may be confused with an axis of rotation of a rotor of a turbomachine. The terms "radial" or "vertical" refer to an orientation of structural elements extending in a direction perpendicular to the axis X. The terms "inner" and "outer", and "internal" and "external" are used in reference to a positioning relative to the axis X. Thus, a structural element extending along the axis X comprises an inner face oriented towards the axis X and an outer surface opposite its inner surface. In the present application, the terms "upstream" and "downstream" are defined with respect to the orientation of flow of the gases in the turbomachine.

FIG. 1 has been described in the above.

The invention applies to a turbomachine 100, in particular for an aircraft, comprising a gas generator or engine. Such a turbomachine may be a turboprop, turbojet or turboshaft engine. The gas generator of the turbomachine typically comprises one or more compressors, for example low pressure and high pressure, arranged upstream of a combustion chamber 9.

The combustion chamber 9 is supplied with compressed air from the high-pressure compressor via an annular diffuser in particular, and with fuel via a fuel supply circuit 1 comprising injectors distributed angularly around a longitudinal axis X of the turbomachine.

Figure 2:
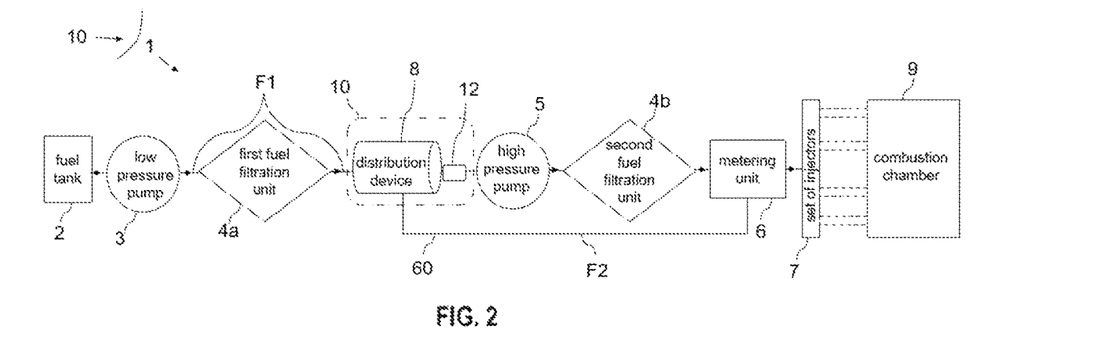
FIG. 2 is a very schematic view of a fuel supply circuit for a combustion chamber of a turbomachine according to the invention.

The fuel supply circuit 1 (or fuel circuit 1 in the present application) of FIG. 2 may comprise the following elements listed here in the orientation of the flowing of the fuel from upstream to downstream:

a fuel tank 2 for storing the fuel, a low-pressure pump LP 3, for example of the rotodynamic type (such as a centrifugal pump allowing a fluid to be pumped and evacuated by rotation of a rotor or an impeller) to ensure the supply of fuel from the tank 2, a first fuel filtration unit 4a for limiting (or even eliminating) the contaminants in the fuel leaving the pump LP 3, a high pressure pump HP 5, for example of the volumetric gear type, a second fuel filtration unit 4b to limit (or even eliminate) the contaminants in the fuel at leaving the HP pump 5, a metering unit 6 to deliver at the outlet a total distributed fuel flow towards the combustion chamber 9, and a set of injectors 7 delivering a total flow of fuel into the combustion chamber 9 of the turbomachine 100.

The LP 3 and HP 4 pumps may be secured to and driven by a same output shaft of an accessory gearbox (not shown in the figure), for example of the AGB type, of the turbomachine 100. This allows in particular the flow rate sent by the LP 3 and HP 5 pumps to be adapted to the needs of the combustion chamber 9.

The LP pump 3 supplies the first filtration unit 4a and the HP pump 5 with a first fuel flow F1 from the tank 2 by means of a supply channel 20. The HP pump 5 supplies the second filtration unit 4b and the metering unit 6 with fuel, for example by means of the supply channel 20, at a higher flow rate than the fuel requirement of the combustion chamber 9.

As described above, an excess amount of fuel is recirculated in the fuel circuit 1 by means of a recirculation channel 60. This recirculation channel 60 is configured to return upstream of the HP pump 5, a second fuel flow F2 corresponding to the excess fuel quantity of the metering unit 6.

Thus, the first flow F1 and the second flow F2 of fuel mix before entering the HP pump 5.

In the example shown in FIG. 2, the channels 20, 60 open in different directions D1, D2 (shown in FIG. 6) upstream of the HP pump 5.

One of the particularity of the invention is that the fuel circuit 1 also comprises a fuel distribution device 8. This distribution device 8 can be releasably assembled upstream of the HP pump 5.

In FIG. 2, and not restrictively, the distribution device 8 is located in a housing 10 of the circuit 1. The device 8 and the housing 10 are located downstream of the first filtration unit 4a and upstream of the HP pump 5. The housing 10 may have a general shape that is at least partly complementary to the general shape of the distribution device 8.

In the case of the fuel circuit 1, the distribution device 8 is configured to channel and ensure a homogeneous mixing of the first F1 and second F2 fuel flows coming, respectively, from the supply channel 20 and the recirculation channel 60.

The channels 20, 60 are configured to open in the manner of a secant into the housing 10 (and hence into the device 8).

In addition, the housing 10 comprises a mixing area 12 for the fuel flows F1, F2 exiting the distribution device 8. In FIG. 2, the mixing area 12 is located downstream of the distribution device 8 and upstream of the HP pump 5.

Figure 3:
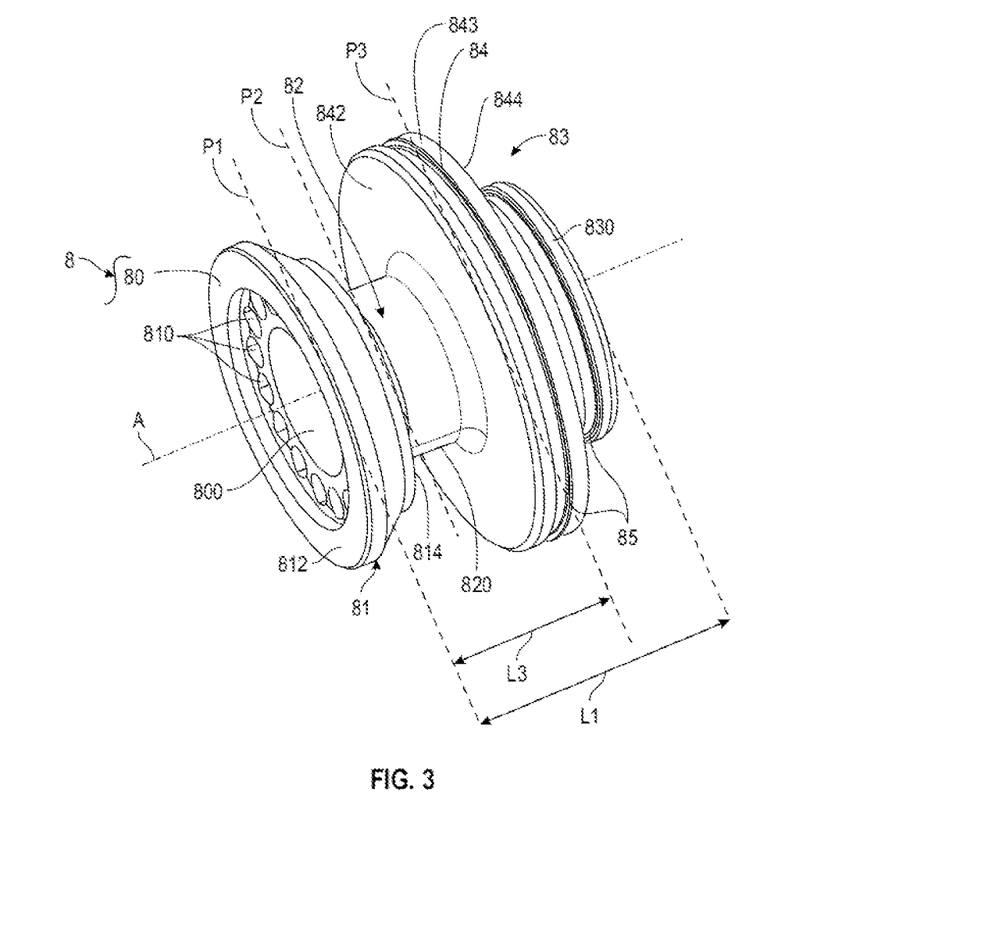
FIG. 3 is a schematic perspective view of the upstream side of a device for distributing at least one fuel flow of the circuit of FIG. 2.
Figure 4:
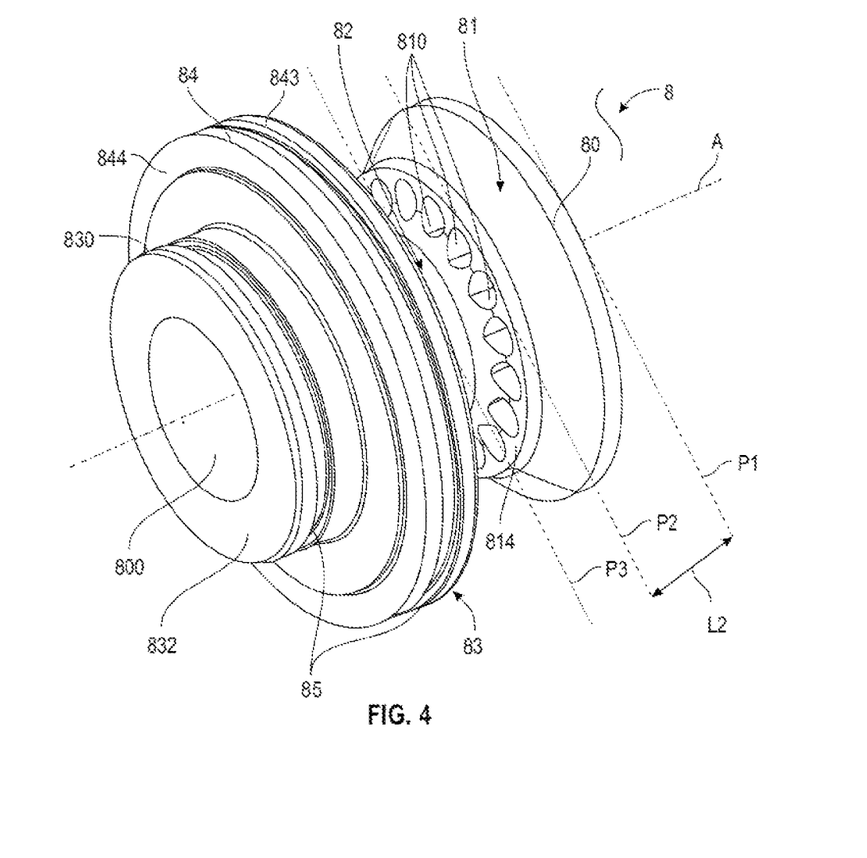
FIG. 4 is a schematic perspective view of the downstream side of the distribution device of FIG. 3.
Figure 5:
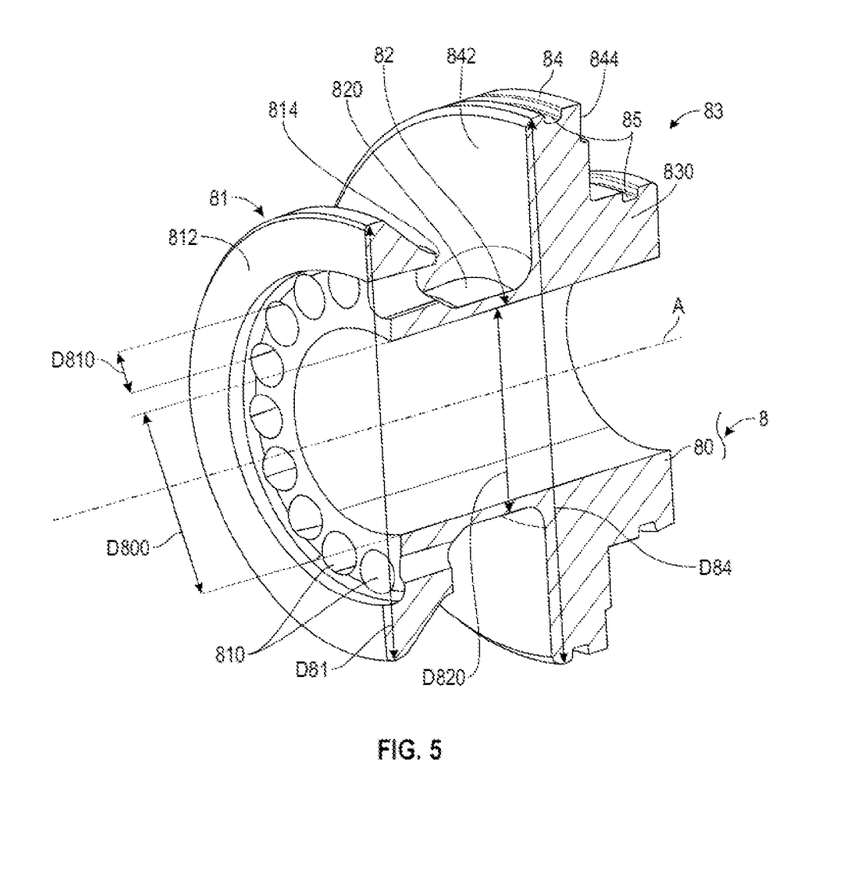
FIG. 5 is a schematic cross-sectional view of the distribution device of FIG. 4.

With reference to FIGS. 3 to 5, we will now describe the fuel distribution device 8 equipping the fuel circuit 1.

The distribution device 8 has a form of revolution extending around a longitudinal axis A. The axis A may be substantially parallel or inclined with respect to the axis X of the turbomachine 100. The distribution device 8 comprises a generally elongate main body 80 extending about the axis A.

In the example of FIGS. 3 to 5, the main body 80 comprises a first annular portion 81, a second annular portion 83 which is opposite (along the axis A) to the first portion 81, and an intermediate portion 82 which connects the annular portions 81, 83 to each other. Advantageously, the portions 81, 82, 83 are formed in one piece (integral).

The main body 80 further comprises an internal flowing conduit 800 extending along the axis A. This internal conduit 800 may have a cylindrical shape. The internal conduit 800 may be formed by a central, through-going opening. In the example, the opening of the internal conduit 800 has a circular cross-section. The opening of the internal conduit 800 may have a diameter $D_{800}$ of between 10 and 50 mm, preferably between 20 and 30 mm. Even more preferably, the diameter $D_{800}$ is about 26 mm. In FIG. 3, the central opening 800 has a length L1 of between 20 and 50 mm. Advantageously, the length L1 is between 25 and 30 mm.

In the example, the opening of the internal conduit 800 forms a fuel inlet passage that is located on the side of the second portion 83 and a fuel outlet passage that is located on the side of the first portion 81. More particularly, the opening of the internal conduit 800 opens onto a front wall 812 of the first portion 81 and a rear wall 832 of a rear end 830 of the second portion 83.

The first portion 81 comprises the front wall 812 and a rear wall 814 which are substantially transverse to the axis A. The front wall 812 passes substantially through a plane P1 and the rear wall 814 passes substantially through a plane P2. In FIGS. 3 and 4, the planes P1 and P2 are substantially perpendicular to the axis A. Furthermore, in the example, the first portion 81 has an annular external surface which is narrowed towards the plane P2.

The first portion 81 further comprises at least one orifice 810. This orifice 810 is configured for the passage of fuel. In the example shown in FIGS. 3 to 5, the first portion 81 comprises an annular row of orifices 810 extending circumferentially about the axis A. Each of the orifices 810 in the annular row of orifices is through-going and extends axially between the planes P1 and P2. In FIG. 4 and non-restrictively, the length L2 between the planes P1 and P2 (corresponding substantially between the front wall 812 and the rear wall 814 respectively) is between 5 and 15 mm, preferably about 8 mm. Each of the orifices 810 may also extend substantially parallel to the central opening of the internal conduit 800. The annular row of orifices comprises between five and twenty orifices, preferably between fifteen and twenty orifices. Even more preferably, there are about seventeen orifices. Each orifice 810 in the annular row of orifices has a diameter $D_{810}$ of between 3 and 10 mm, preferably between 5 and 7 mm, and even more preferably of about 5.5 mm. The opening of the internal conduit 800 and the orifices 810 are coaxial, in particular with respect to the axis A.

The first portion 81 is configured to form a fuel outlet passage. The annular row of orifices is configured to form both a fuel inlet passage and a fuel outlet passage.

The intermediate portion 82 defines an annular gorge 820 between the first 81 and second 83 portions. Thus, in the example, the annular gorge 820 extends from front to rear between the plane P2 and a plane P3. The plane P3 is roughly parallel to the planes P1 and P2. In FIG. 3 and non-restrictively, the length L3 between the planes P1 and P3 (corresponding substantially respectively between the front wall 812 of the first portion 81 and an end of the intermediate portion 82 which is opposite to the wall 812) is between 15 and 30 mm, preferably about 21 mm. This annular gorge 820 is in fluidic communication with the orifices 810 of the first portion 81. The annular gorge 820 is configured to form a fuel inlet passage.

The second portion 83 comprises an annular collar 84 extending radially outwardly and about the axis A. The annular collar 84 is located on the side of the intermediate portion 82. The annular collar 84 has a front flank 842 and a rear flank 844 which is axially opposite the front flank 842. The flanks 842, 844 are connected by a peripheral annular surface 843. In the example, the front flank 842 is defined substantially in the plane P3.

The second portion 83 also comprises at least one annular groove 85, referred to as sealing and attaching, extending about the axis A. The annular sealing and attaching groove 85 is configured for mounting a sealing element 850. In particular, in the example, it has a U-shaped axial cross-section and opens onto the annular peripheral surface 843. Advantageously, this sealing element 850 is an O-ring (shown in FIG. 6). Similarly, in the example, the rear end 830 may also comprise the annular groove 85 which may be U-shaped in axial cross-section and open into an annular peripheral surface of the rear end 830. In FIG. 5, the second portion 83 comprises two annular grooves 85 arranged, respectively, on the annular collar 84 and on the rear end 830 which is opposite (along the axis A) to the annular collar 84.

In the example, the annular collar 84 has an external diameter D84 (delimited by the external peripheral surface 843) greater than the external diameter of the rear end 830 of the second portion 83. The second portion 83 is configured to form a fuel inlet passage.

In the example, the external diameter $D_{84}$ of the annular collar 84 is greater than the external diameter $D_{81}$ of the first portion 81. The external diameter $D_{81}$ of the first portion 81 is greater than the external diameter D820 of the annular gorge 820.

Figure 6:
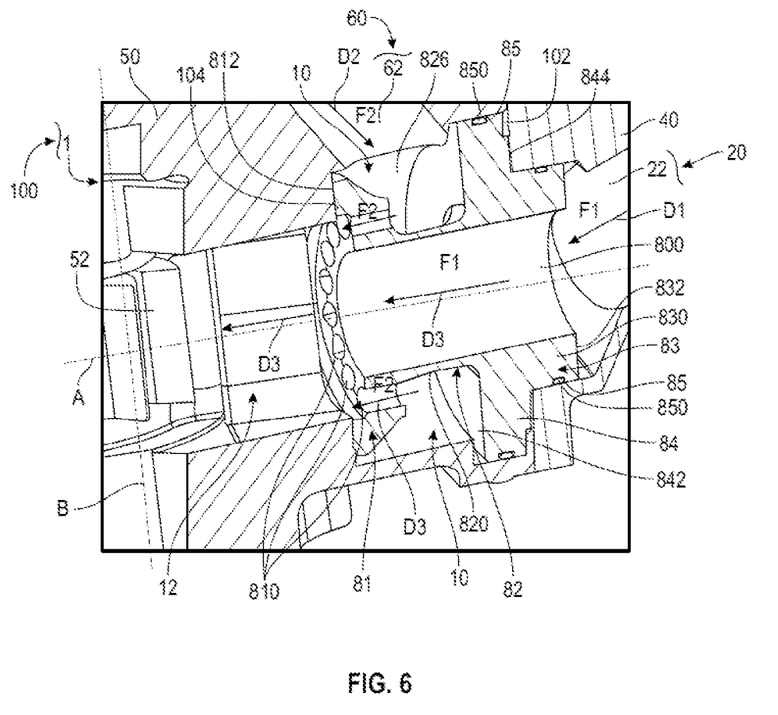
FIG. 6 is an enlarged schematic cross-sectional view of the arrangement of the distribution device of FIGS. 3 to 5 in the supply circuit of FIG. 2.

We will now describe the distribution device 8 equipped in the fuel circuit 1 of the invention. With reference to FIGS. 2 and 6 and not limited to them, the distribution device 8 is assembled in the housing 10 arranged downstream of the first filtering unit 4a and upstream of the HP pump 5.

The HP 5 pump can be of the volumetric gear type. In this case, the HP pump 5 may comprise one or more toothed wheels 52. The toothed wheel 52 has an axis of rotation B, as shown in FIG. 6. This axis B is substantially perpendicular to the axis A of the device 8.

The housing 10 has a generally cylindrical shape extending along an axis of revolution. In FIG. 6, this axis of revolution of the housing 10 coincides substantially with the axis A of the distribution device 8. The housing 10 may be formed by the walls of at least one of the casings 40, 50 and/or at least one of the channels 20, 60 of the fuel circuit 1. In the example and not restrictively, the housing 10 is located at least partly between the casings 40, 50 of the first filtering unit 4a and the HP pump 5.

In FIG. 6, the housing 10 opens at least partly radially into the recirculation channel 60. In addition, the housing 10 opens upstream into the supply channel 20 and downstream into the mixing area 12 of the fuel circuit 1.

The mixing area 12 is generally annular or cylindrical in shape. In the example, this mixing area 12 may also extend along a longitudinal axis which coincides with the axis of revolution of the housing 10 and the axis A of the distribution device 8.

In FIG. 6, the mixing area 12 thus opens upstream into the housing 10 (and also the first portion 81 of the distribution device 8 installed in the housing 10), and downstream into the HP pump 5 (e.g., into the gears of the toothed wheel 52 of the HP pump 5).

In FIG. 6, the front wall 812 of the first portion 81 of the distribution device 8 is in contact against an upstream wall 102 of the housing 10. In the example, the housing 10 may correspond to a wall of the casing 50 of the HP pump 5. The front flank 842 of the annular collar 84 of the distribution device 8 is in contact against a downstream wall 104 of the housing 10. In the example, the casing 40 of the first filtering unit 4a carries the downstream wall 104.

In the example, O-rings 850 are installed between the grooves 85 of the distribution device 8 and internal annular surfaces of the casings 40, 50. These O-rings are sufficient to securely and tightly maintain the distribution device 8 in the housing 10.

The supply channel 20 of the circuit 1 comprises an upstream outlet 22 which opens into the central opening 800 on the side of the second portion 83, upstream of the distribution device 8. The upstream outlet 22 is oriented in a direction extending substantially inclined or axial with respect to the axis A.

The recirculation channel 60 of the circuit 1 comprises an upstream outlet 62 opening into the housing 10, in particular into the annular gorge 820 of the intermediate portion 82. The downstream outlet 62 is oriented in a direction extending substantially transversely with respect to the axis A. In particular, the outlet direction is perpendicular or inclined (at an angle of between 20 and 50°) with respect to the axis A.

With reference to FIG. 6, the first fuel flow F1 originates from the supply channel 20 along a first direction D1, and the second fuel flow F2 originates from the recirculation channel 60 along a second direction D2.

The first fuel flow F1 passes through the central opening of the conduit 800 of the distribution device 8 to open into the mixing area 12 and then into the HP pump 5. This allows the first flow F1 to flow into and out of the distribution device 8 in a third direction D3. This third direction D3 is coaxial with the axis A and also with the axes of revolution of the mixing area 12 and the housing 10. The direction D3 of flowing of the first flow F1 may be different to the first direction D1 when the upstream outlet 22 opens inclined with respect to the axis A (as shown in FIG. 6), or coaxial to the direction D1 when the upstream outlet 22 opens axially to the axis A.

Advantageously, the first flow F1 in the third direction D3 opens out substantially perpendicular to the axis B of the toothed wheel 52 of the HP pump 5.

The walls formed in the housing 10 by the upstream end 62 and the annular gorge 820 form an annular chamber 826 into which the second fuel flow F2 enters the distribution device 8. The second flow F2 then passes through the orifices 810 of the first portion 81 to open into the mixing area 12 and then in the HP pump 5. This allows the second flow F2 to flow into and out of the distribution device 8 also in the third direction D3. In the example, this direction D3 of flowing of the second flow F2 is different from the second direction D2.

In the annular chamber 826, the second flow F2 is slowed down with respect to its speed in the recirculation channel 60. This allows the second flow F2 to change from a turbulent state in the recirculation channel 60 to a laminar state in the orifices 810 and then in the mixing area 12.

It is understood that the distribution device of the invention is located at the confluence of the outlets of the first and second flows F1, F2 and that the flows mix at the outlet of the distribution device.

This means that the fuel flows F1, F2 opening into the mixing area 12 have no or very little cavitation before entering the HP pump 5. In the mixing area 12, the fuel flows F1, F2 are made homogeneous for their flowing into the HP pump 5.

In the present application, the distribution device is described for the distribution or channelling of fuel for a fuel supply circuit of a combustion chamber of a turbomachine, in particular for an aircraft. The distribution device of the invention can also be adapted for any type of fluid and for hydromechanical systems of turbomachine other than the aeronautical field.

The fuel distribution device equipping the fuel supply circuit according to the invention provides several advantages, which are in particular for:
optimising the mixing and the homogenisation of the fuel flows from the secant and non-coaxial supply and recirculation channels upstream of the supply pump,
providing a distribution and mixing device within the overall dimension and the available space of the fuel circuit,
optimising the service life of the supply pump by preventing the formation of cavitations in the fuel,
easily attaching and detaching from the supply circuit,
limiting the maintenance cost of a supply pump of the fuel circuit, and
easily adapting to the existing gas generators.

Overall, this proposed solution is simple, effective and economical to carry out and assemble on a turbomachine, while providing an optimal fuel supply and an improved service life of at least one of the components of a fuel supply circuit for a combustion chamber of a turbomachine.

The invention claimed is:

1. A distribution device of at least one fuel flow for a fuel supply circuit of a combustion chamber of a turbomachine, in particular an aircraft, the distribution device comprising a main body of revolution extending about a longitudinal axis, the main body comprising:
an internal conduit for the flow of a first fuel flow and extending through the main body along the longitudinal axis,
a first annular portion configured to form an outlet passage for a second fuel flow, and comprising at least one passage orifice for the second fuel flow, and
an external annular gorge in fluid communication with said at least one orifice of the first annular portion, and
a second annular portion configured to form an inlet passage for the first fuel flow through the internal conduit,
wherein the second annular portion comprises an annular collar extending radially about the longitudinal axis.

2. The device according to claim 1, wherein said at least one passage orifice of the second fuel flow is distributed in an annular row of orifices.

3. The device according to claim 2, wherein the annular row of orifices each extend along an axis parallel to the longitudinal axis.

4. The device according to claim 2, wherein the annular row of orifices comprises between five and twenty orifices.

5. The device according to claim 2, wherein each orifice in the annular row of orifices has a diameter ($D_{810}$) of about 5.5 mm.

6. The device according to claim 2, wherein the annular row of orifices comprises about seventeen orifices.

7. The device according to claim 1, wherein the second annular portion is connected to the first annular portion via an intermediate annular portion of the distribution device delimiting at least partly the internal conduit.

8. The device according to claim 7, wherein the external annular gorge extends around the intermediate annular portion between the first annular portion and the second annular portion.

9. The device according to claim 7, wherein the annular collar is between the second annular portion and the intermediate annular portion.

10. The device according to claim 1, wherein the external annular gorge is delimited at least partly by a flank of the annular collar and a wall of the first annular portion.

11. The device according to claim 1, wherein the second annular portion further comprises at least one annular sealing and attaching groove configured for mounting a sealing element.

12. The device according to claim 1, wherein the first annular portion has an external diameter ($D_{81}$) smaller than an external diameter ($D_{84}$) of the annular collar of the second annular portion.

13. The device according to claim 1, wherein each orifice in the annular row of orifices has a diameter ($D_{810}$) of between 3 and 10 mm.

14. A turbomachine, in particular an aircraft turbomachine, comprising a distribution device of at least one fuel flow according to claim 1, for a fuel supply circuit of a combustion chamber of the turbomachine.

15. The device according to claim 1, wherein the annular collar comprise an annular groove.

16. The device according to claim 1, wherein the annular collar is without through-orifices.

17. A distribution device of at least one fuel flow for a fuel supply circuit of a combustion chamber of a turbomachine, in particular an aircraft, the distribution device comprising a main body of revolution extending about a longitudinal axis, the main body comprising:
- an internal conduit for the flow of a first fuel flow and extending through the main body along the longitudinal axis,
- a first annular portion configured to form an outlet passage for a second fuel flow, and comprising at least one passage orifice for the second fuel flow, and
- an external annular gorge in fluid communication with said at least one orifice of the first annular portion, and
- a second annular portion configured to form an inlet passage for the first fuel flow through the internal conduit,
- wherein the second annular portion comprises an annular collar extending radially about the longitudinal axis, and
- wherein the external annular gorge is delimited at least partly by a flank of the annular collar and a wall of the first annular portion.

* * * * *